(No Model.)
C. HÄFNER.
FILTER.
No. 521,650.　　　　　　　　Patented June 19, 1894.
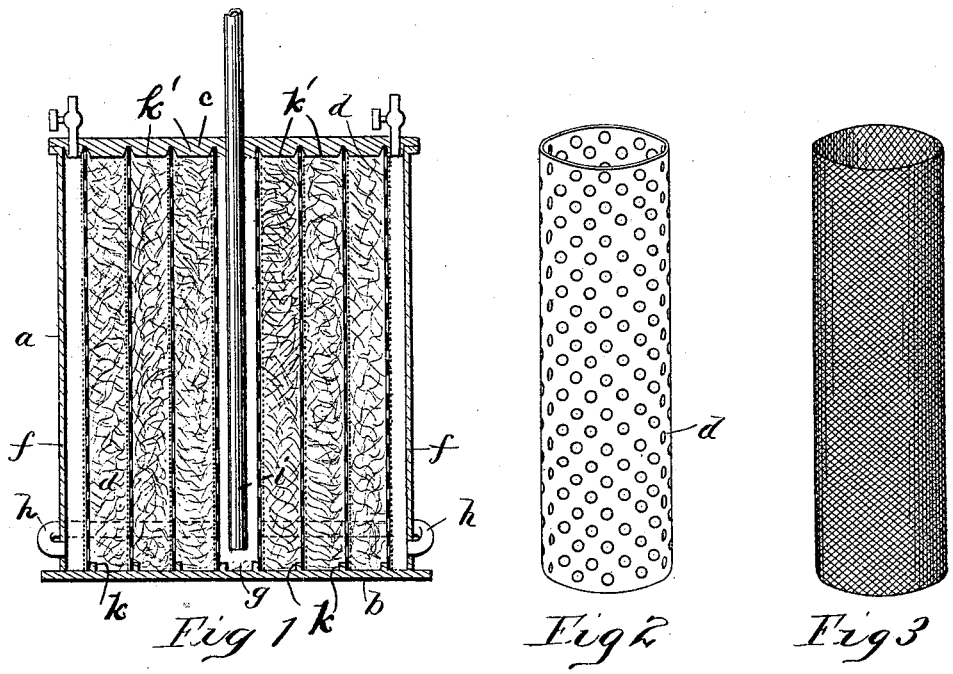
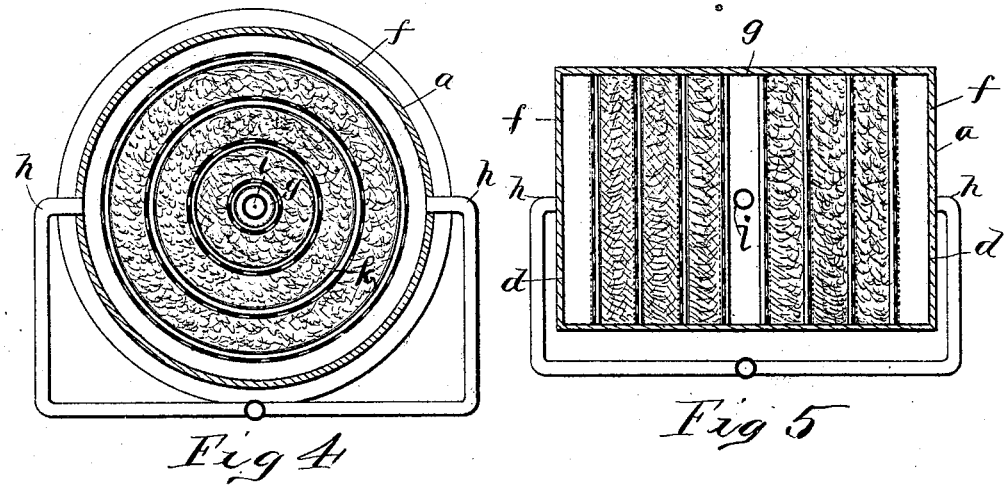
WITNESSES:
INVENTOR
Carl Häfner
BY
O. E. Duffy
ATTORNEY.
THE NATIONAL LITHOGRAPHING COMPANY,
WASHINGTON, D. C.

UNITED STATES PATENT OFFICE.

CARL HÄFNER, OF CHATTANOOGA, TENNESSEE, ASSIGNOR TO CHARLES REIF AND JOHN KRAUS, TRUSTEE, OF SAME PLACE.

FILTER.

SPECIFICATION forming part of Letters Patent No. 521,650, dated June 19, 1894.

Application filed June 3, 1893. Serial No. 476,510. (No model.)

*To all whom it may concern:*

Be it known that I, CARL HÄFNER, of Chattanooga, in the county of Hamilton and State of Tennessee, have invented certain new and useful Improvements in Filters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in filters, particularly beer filters.

The object of the invention is to provide an improved beer filter exceedingly cheap, simple and durable in construction, and which will thoroughly and economically filter the beer in an improved manner.

The invention consists in certain novel features of construction and in combination of the parts more fully pointed out hereinafter and particularly described in the claim.

Referring to the accompanying drawings Figure 1, shows a vertical longitudinal sectional view of the filter. Figs. 2, 3, and 4 are detailed views of parts thereof. Fig. 5, is a vertical sectional view of a modified construction.

In the drawings reference letter $a$, indicates the casing or outer wall of the filter, preferably, although not necessarily cylindrical, provided with the floor $b$, and the removable cover $c$. A series of cylinders $d$ are concentrically located within the cylinder. These walls or cylinders $d$ are perforated, substantially as shown, and are located a suitable distance apart. The spaces between the walls or cylinders are filled with any suitable filtering material, such as hops, which have been used and fully cleansed and which will remove the particles of yeast or other impurities from the beer as it is forced through the hops. A wall of wire gauze is located around the surface of each reticulated tube to prevent the hops being forced through the reticulated plates or walls by the beer. These walls can have fine meshes of any desired degree of fineness and they are, preferably, composed of wire gauze or other suitable material which will hold the hops within the reticulated walls.

A space $f$, is formed between the inner surface of the casing of the filter and the outermost reticulated wall. The innermost reticulated wall also forms a central vertical space $g$, for the beer and in which the beer collects after it has been forced through the hops.

$h$, indicates the inlet or supply pipe to the filter which is branched and enters the said outer space on opposite sides of the filter as shown. The supply pipe can be provided with a suitable check valve mechanism to prevent inflow of air to the filter when the supply of beer is exhausted. This device can consist of a floating ball, such as a rubber ball, which will float in the beer, but as the beer ceases to flow from the cask or keg, the ball drops to its seat and closes the inlet to the filter. The beer is usually forced from a cask or keg by air pressure which is sufficient to force the beer from the annular space at the exterior of the filtering material through said material to the central space.

$i$, indicates the outlet pipe from the filter preferably extending down through the top wall thereof and through said central vertical space to a point near the bottom thereof, so that the beer will be drawn off through said pipe without taking off the foam which collects on the top of the beer in the filter.

The bottom of the filter is preferably provided with concentric series of ridges $k$, as shown to receive the reticulated walls and the gauze walls lying against the same, and to support and hold said parts in position. The removable top of the filter is provided with corresponding annular ribs $k'$ having grooves between them which receive the top edges of the said reticulated walls and screens and hold them firmly in position and a desired distance apart, while the ribs press down the hops in the spaces between the reticulated walls or tubes and firmly hold them in position.

In Fig. 5, I show a rectangular filter in which the walls are arranged in the form of straight partitions spreading completely across the filter leaving the beer inlet spaces at opposite ends of the filter and the beer outlet space or chamber at the center of the filter and extending completely across the same. In this case the same invention and construction are employed as before described: the reticulated walls are provided with a gauze netting or screening to prevent the dislodgment of the filtering material.

The many advantages and extreme simplicity of this filter are obvious. The filter can be easily cleaned and the filtering material can be removed at any time; the filter is composed of a minimum number of parts which are cheap and durable in construction. Also the filter is easily operated and does not require expert care and attention.

Having thus fully described my invention, what I claim as new, and desire to secure by Letters Patent of the United States, is—

The herein described beer filter composed of the casing, the plurality of separately removable perforated parallel concentric plates $d$, having interposed sheets of gauze, the spaces between said plates receiving filtering material such as hops, the closed bottom of the casing formed to removably receive the lower edges of said plates $d$, and the single removable cover $c$, of the casing having the plurality of separated ribs on its under side projecting down into the spaces between the said plates to press down the loose filtering material and in the grooves between which the plates are held as set forth.

In testimony that I claim the foregoing as my own I affix my signature in presence of two witnesses.

CARL HÄFNER.

Witnesses:
J. G. C. PARKHAUS, Jr.,
CHAS. A. WEBER.